Jan. 6, 1970   M. BAERMANN   3,488,535
PERMANENT MAGNET EDDY CURRENT BRAKE OR CLUTCH
Filed Sept. 5, 1968   3 Sheets-Sheet 1

INVENTOR.
MAX BAERMANN
BY
Meyer, Tilberry & Body
ATTORNEYS

INVENTOR.
MAX BAERMANN
BY
Meyer, Tilberry & Body
ATTORNEYS

INVENTOR.
MAX BAERMANN
BY Meyer, Tilberry & Body
ATTORNEYS

United States Patent Office 3,488,535
Patented Jan. 6, 1970

3,488,535
PERMANENT MAGNET EDDY CURRENT BRAKE OR CLUTCH
Max Baermann, 506 Bensberg, Wulshof,
Bezirk, Cologne (Rhine), Germany
Filed Sept. 5, 1968, Ser. No. 757,562
Claims priority, application Germany, Sept. 22, 1967,
1,613,031
Int. Cl. H02k 49/10
U.S. Cl. 310—93                                    9 Claims

ABSTRACT OF THE DISCLOSURE

A magnet system for eddy current brakes or clutches including two adjacent rings of permanent magnets which are relatively movable so that the flux of one ring either adds to or substracts from the flux of the other ring and the flux threading into the brake or clutch disc can be varied with the application of a relatively small amount of force to one of the rings. One ring is made of a plurality of circumferentially spaced permanent magnets with magnetically permeable pole shoes extending axially through arcuate spaces between the permanent magnets. The magnets are magnetized on corcumferentially extending axes with adjacent poles of each pair of magnets of like polarity so that adjacent pole shoes are of alternate magnetic polarity. The other ring is made up of circumferentially spaced magnets magnetized on axes normal to the plane of the ring and mounted on a magnetically permeable disc. The spacing is such that the magnets of the two rings can be aligned so that their flux adds or offset so that their flux subtracts to control the amount flux threading into the eddy current disc.

---

This application pertains to the art of permanent magnet systems for eddy current brakes or clutches, and, more particularly, to a system where the flux in the clutching or braking disc may be readily varied from an on or off condition.

The invention is particularly applicable to eddy current brakes or clutches for motor vehicles and will be described with particular reference thereto, although it will be appreciated that the invention has broader applications, such as in air vehicles or rail vehicles, and also for gear driven apparatus, such as elevators, cranes and the like.

Permanent magnet eddy current brakes have heretofore been comprised of a ring of alternately poled permanent magnets supported on a disc-shaped carrier body which can be shifted with respect to an adjacent ring of pole shoes in order to vary the flux in a working air gap. The alternately poled surfaces of the permanent magnets were arranged adjacent to the pole shoes when the brake is in a switched-on position, and the pole surfaces of the permanent magnets were short circuited by the pole shoes when the brake is in a switched-off position.

One of the problems inherent in this design of an eddy current brake has been that it is difficult to provide the relatively large quantity of permanent magnet material, needed for producing a desired braking flux, in the relatively small space which is available. Because of the relatively large dimensions of this type of brake, the power per unit weight is low, and relatively strong forces are required to switch the brake on and off. Another problem has been that there has been a high leakage of flux from the permanent magnets resulting in an inefficient use of the magnet material. The above-mentioned problems have been essentially decisive reasons for avoiding the use of permanent magnet eddy current brakes.

Because of these inherent difficulties with permanent magnet eddy current brakes, electromagnetic eddy current brakes have been developed. This type of brake is dependent on a constant current supply for its operation. One of the difficulties with the electromagnetic eddy current brakes is that if the source of current is interrupted, the brake will fail. Relatively high amounts of energy are required for braking vehicles with heavy loads, and the entire energy used for producing the magnetic filed is converted into heat. This means that the energy, from 1 to 4 kilowatts, necessary for braking a truck heats the magnet coils to a considerable temperature. The temperature of the coils is increased further due to the transfer of heat produced in the eddy current disc during the braking process. In the usual air-cooled eddy current brakes the coils are heated to temperatures corresponding to redness, the dissipation of which has involved considerable difficulties. Because of these difficulties, the presently known electromagnetic eddy current brakes generally provide a full braking effect, without failing, for only relatively short periods of time.

The present invention contemplates a new and improved magnet system which overcomes all of the above-referred problems and others, and provides an eddy current brake or clutch which is safe and efficient to operate, economical to manufacture and which effectively uses the space available.

In accordance with the present invention, there is provided a magnet system for an eddy current coupling comprised of coaxial first and second adjacent rings of permanent magnets; the first ring is stationary and includes a plurality of circumferentially spaced permanent magnets magnetized on circumferentially extending axes with magnetically permeable pole shoes extending axially through arcuate spaces between adjacent permanent magnets and contiguous thereto so that adjacent pole shoes are of alternate magnetic polarity, and the second ring includes a plurality of circumferentially spaced permanent magnets magnetized on axial extending axes with adjacent permanent magnets of the second ring having poles of opposite polarity, the two rings being relatively circumferentially shiftable such that when the poles of the second ring are bridging between like poles of the first ring the flux from the two rings of magnets adds and so that when the poles of the second ring are not bridging between like poles of the first ring, the flux from the rings of magnets subtracts.

In a preferred embodiment of the invention, each pole shoe on the second ring has two leg members connected by a ferromagnetic bridge member. The ferromagnetic bridge member touches the pole surfaces of the second ring of permanent magnets so as to have induced therein poles of like polarity in each of the leg members of the pole shoes, and the adjacent pole shoes have leg members of opposite induced polarity. The permanent magnets of the first ring are fastened between the leg members of adjacent pole shoes by gluing or casting. The leakage flux is reduced by this method of construction because the space between adjacent pole shoes is completely filled with permanent magnet material and because each leg member of a pole shoe has a like polarity. There is no appreciable leakage flux between the adjacent leg members of any pole shoe with this arrangement, and it is possible to place the amount of permanent magnet material required in the smallest possible space. The magnets used in the invention need not be expensive permanent magnets, such as steel alloys containing nickel and cobalt. Cheaper magnet materials of high coercive force and low permeability, such as Barium Ferrite or the equivalent, may be used.

The subdivision of each pole shoe to provide two leg members produces air channels between the eddy current disc and a disc made of nonmagnetic material to which the pole shoes are attached. Cooling air is guided through the channels by injector effect so that the eddy current disc is cooled on the side of the working air gap. These channels provide cooling for the pole shoes as well as the casting for the magnets. This improved cooling control allows the use of permanent magnet material with a relatively low Curie point.

The eddy current disc includes a disc per se of electrically conductive material, such as copper, and fan blades made of ferromagnetic material are fastened to the disc on the side opposite the working air gap. The use of ferromagnetic material for the fan blades is for the purpose of further concentrating the lines of magnetic flux and the use of this material makes it possible to reduce the cross section of the eddy current disc, thus reducing the heat resistance of the disc.

The principal object of the invention is the provision of a new and improved permanent magnet system for an eddy current brake or clutch which is simple in construction, positive in operation and is readily controlled by a relatively small force to set the desired braking flux.

Another object of the invention is the provision of a new and improved permanent magnet system for an eddy current brake or clutch which uses magnet material of high coercive force and low permeability in an arrangement that eliminates the need for a supply of electric current.

Still another object of the invention is the provision of a new and improved permanent magnet system for an eddy current brake or clutch which minimizes leakage flux in the system by concentrating the lines of flux in a pole shoe arrangement.

Still another object of the invention is the provision of a new and improved permanent magnet system for an eddy current brake or clutch with air channels formed between the pole shoes and the eddy current disc for improving the heat dissipation of the system.

The invention may take physical form in certain parts and arrangement of parts, a preferred embodiment which will be described in detail in the specification and illustrated in the accompanying drawings which form a part hereof and wherein.

Figure 1:
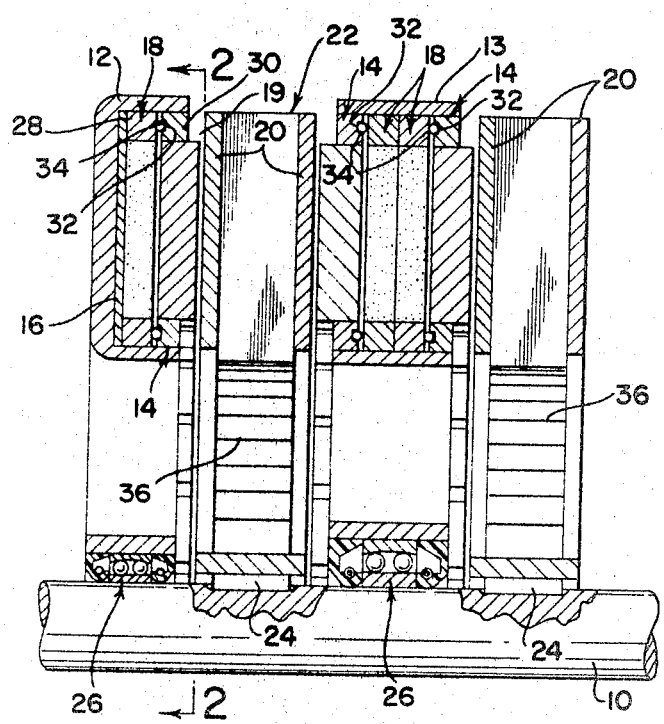
FIGURE 1 is an axial half-section of an eddy current device according to the invention.

Referring now to the drawings wherein the showings are for the purposes of illustrating preferred embodiments of the invention only and not for the purposes of limiting same, FIGURE 1 shows an eddy current brake comprised of a disc 20 and a magnet arrangement for creating a variable flux field which threads into the disc 20 and which arrangement includes a stationary magnet arrangement 14 and a relatively movable arrangement 18 mounted in casing 12.

In FIGURE 1, the disc 20 is mechanically keyed to a shaft 10 with a conventional key arrangement 24. The configuration shown is especially appropriate for motor vehicles, and the brake is attached between the driving part and the driven part, the former corresponding to the transmission and the latter to the differential of a motor vehicle. The casing 12 is supported by bearings 26 encircling the shaft 10 and is fastened to the frame of the motor vehicle. It is the motion of the eddy current disc 20 relative to the movable permanent magnet arrangement 18 to which we direct our attention herein.

Each eddy current disc 20 has associated with it a fan arrangement 22, a stationary permanent magnet arrangement 14 and a movable permanent magnet arrangement 18, and any number of such units so comprised may be added to the system in order to achieve the desired braking moment of the shaft 10. FIGURE 1 illustrates the arrangement which may be used with three such units, wherein the casing 13 is used for two oppositely facing stationary permanent magnet arrangements 14 and their associated eddy current discs 20. Fan blades 36 have been attached to the eddy current discs 20 in the fan arrangement 22 for purposes of dissipating the heat generated in the eddy current disc 20 during eddy current braking.

A flat annular member 30 fixed to the casing 12 has a ring shaped circumferential groove 32 provided in its face. Bearings 34 are inserted between the member 30 and a circumferentially movable flat annular member 28 in order that the permanent magnet arrangement 18 may be circumferentially shifted with respect to the stationary magnet arrangement 14 to control the magnetic flux in the working air gap 19. Both mmebers 30, 28 are made from a nonmagnetic material.

Figure 2:
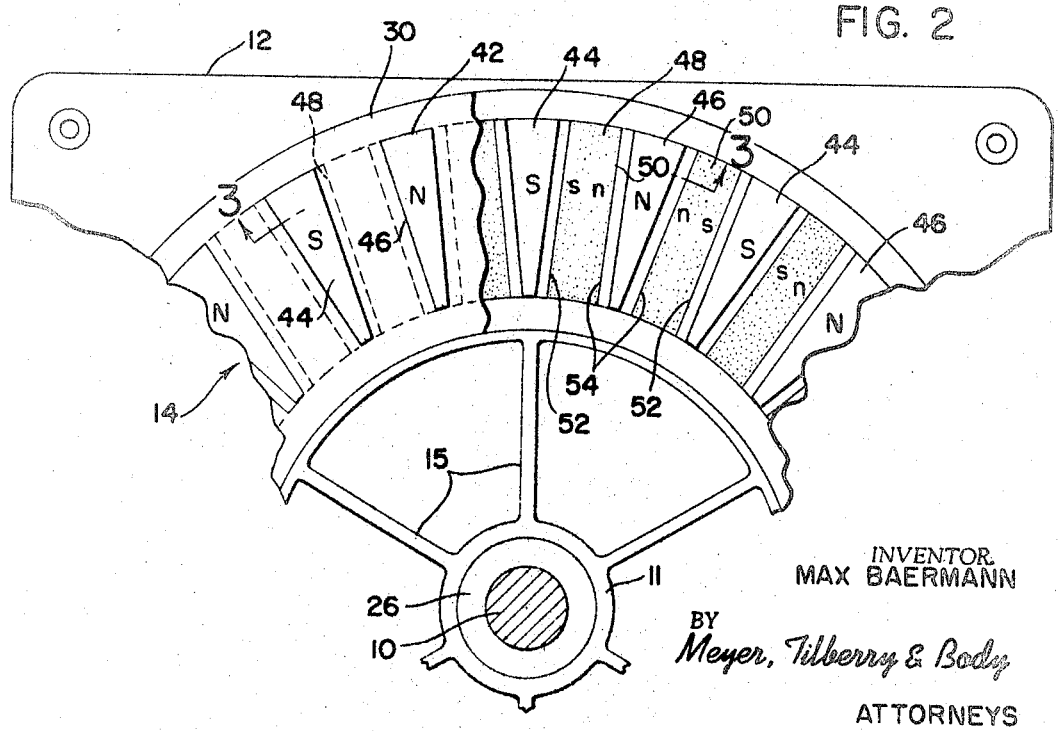
FIGURE 2 is a partial sectional view along the line 2—2 of FIGURE 1, which shows the stationary magnet arrangement with pole shoe spaced between adjacent magnets.

Referring now to FIGURE 2, the stationary magnet arrangement 14 will be described. The member 30 is fixed to the casing 12 and is spaced from the shaft 10 by spokes 15 fastened to a hub 11 which surrounds the shaft bearing 26. A plurality of wedge shaped apertures 42 are provided around the member 30, each of which has a pole shoe 44 extending therethrough. A plurality of magnets 48, 50 are interposed between each pair of pole shoes 44, 46 below the plane of the member 30. Alternate permanent magnets 48 have a south pole surface designated with an $s$ contiguous to a vertical face 52 of one pole shoe 44 and a north pole surface designated $n$ contiguous to a vertical face of an adjacent pole shoe 46. In a similar fashion, the intermediate magnets 50 have similarly designated pole surfaces contigous to the other vertical faces of these pole shoes. These magnets induce alternate magnetic polarity in the pole shoes 44, 46 around the member 30 which provides a flux in the working air gap 19. It should be noted that these magnets 48, 50 have been magnetized on circumferentially extending axes so that adjacent magnets have facing pole surfaces of like polarity.

Figure 3:
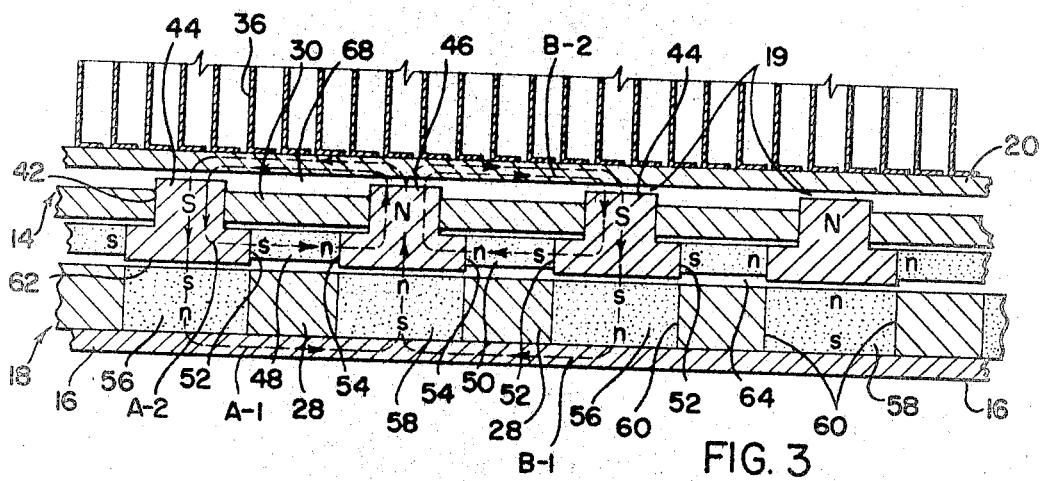
FIGURE 3 is a side elevational view, partially in section of one embodiment of the permanent magnet system with inverted T pole shoes, and the system in a switched-on position.

The relative positions of the eddy current disc 20, the stationary permanent magnet arrangement 14 and the movable permanent magnet arrangement 18 are shown in FIGURE 3. The circumferentially shiftable permanent magnet arrangement 18 includes a plurality of spaced permanent magnets 56, 58 mounted on an annular iron plate 16 which serves as a flux path between the magnets and an annular member made from nonmagnetic material to hold these magnets in position. These magnets have alternately poled pole surfaces in the plane of the member 28 and otherwise conform to wedge shaped apertures in the member 28, being contiguous to the vertical surfaces 60 therein. The oppositely poled pole surfaces of permanent magnets 56, 58 are in the plane of member 28 adjacent to a base surface 62 of pole shoes 44, 46. It should be noted that these magnets 56, 58 have been magnetized on axial extending axes so that adjacent magnets have pole surfaces of opposite polarity facing the adjacent surfaces of pole shoes 44, 46. The pole shoes 44, 46 have an induced polarity corresponding to the pole surface of the permanent magnet adjacent to their adjacent base surface 62.

The south pole of permanent magnet 48 contributes to the induced S polarity of pole shoe 44 caused by permanent magnet 56, and that the north pole of permanent magnet 48 contributes to the induced N polarity of pole shoe 46 caused by permanent magnet 58. This, however, is only true when some portion of the south pole surface of magnet 56 is adjacent to the base surface of pole shoes 44 and the north pole surface of magnet 58 is adjacent to the base surface of pole shoe 46. When the permanent magnet arrangement 18 is circumferentially shifted with respect to the permanent magnet arrangement 14, the induced polarity in the pole shoes changes in degree and may be completely cancelled due to the relative position of the magnets. Complete cancellation of the induced polarity of a pole shoe is achieved when the total of like pole surfaces of the permanent magnets adjacent a pole shoe is equal to the oppositely poled pole surface of a permanent magnet adjacent to the pole shoe.

As may be seen in FIGURE 3, using a conventional flux direction, flux paths A–1 and A–2 are established in a counterclockwise direction through pole shoes 44 and 46, and flux paths B–1 and B–2 are established in a clockwise direction through pole shoes 46 and 44. Note that the flux paths A–1 and A–2 and the flux paths B–1 and B–2 are additive in the air gap 19 between the pole shoes 44 and 46, and the eddy current disc 20. This corresponds to an on-braking condition because of the relatively large induced eddy current in the eddy current disc 20 from the additive flux paths in air gap 19.

Figure 4:
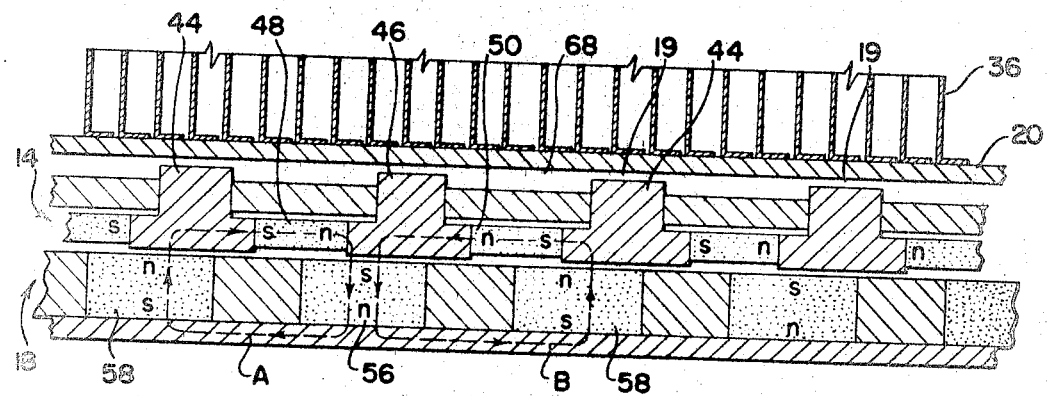
FIGURE 4 is the same embodiment as shown in FIGURE 3 in a switched-off position.

Looking now to FIGURE 4, it may be seen that the permanent magnet arrangement 18 is shifted with respect to the stationary permanent magnet arrangement 14 so that the induced polarity of the pole shoes 44, 46 has been cancelled out completely. This is caused by the relative positions of the pole surfaces of permanent magnets 56, 58 with respect to the base surfaces of pole shoes 44, 46. A flux path A in the clockwise direction and a flux path B in the coutnerclockwise direction now exists, neither of which passes through the working air gap 19 between the pole shoes and the eddy current disc 20. The effect of these magnetic flux paths is such as to eliminate any eddy currents from being produced in the eddy current disc 20. This condition corresponds to the eddy current brake being completely shut off. The eddy current brake is variable between the limiting conditions illustrated in FIGURES 3 and 4 by circumferentially shifting the pole surfaces of permanent magnets 56, 58 wth respect to the base surface 62 of pole shoes 44, 46. Since the bearings 34 (as shown in FIGURE 1) are provided between the magnet arrangement 18 and the magnet arrangement 14, the relative positions of the permanents 56, 58 with respect to the pole shoes is easily changed in order to obtain the desired braking flux.

Another feature inherent in the design shown in FIGURES 3 and 4 is that air channels 68 are formed between adjacent pole shoes 44, 46. This provides circulating air between the eddy current disc 20 and the magnet arrangement 14 in order to reduce the high temperatures generated during braking. The injection of air into the region of the pole shoes can be accomplished by attaching directing plates to the circumference of the member 30 in order to guide the air through the air channels 68. Fan blades 36 are fastened to the exterior side of the disc 20. The fan blades may be made to laterally protrude at the circumference of disc 20 in order to direct the air into the air channels 68.

The fan blades 36 may be made of a ferromagnetic material in order to provide increased concentration of the lines of magnetic flux in the eddy current disc 20. The fan blades are preferably made of a thin sheet of iron provided with a copper coating covered with a nickel coating to prevent corrosion. The coating of copper may range between .05 to 0.2 millimeters. A copper coating of this nature improves the heat dissipation of the fan blades as well as facilitating the formation of eddy currents on the eddy current disc 20. Copper plated sheet iron can also be used for these purposes.

Figure 5:
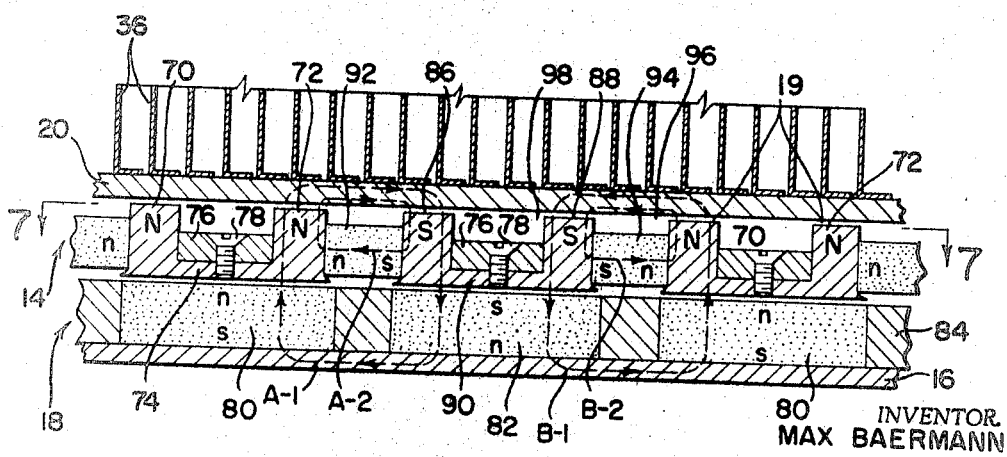
FIGURE 5 is a side elevational view, partially in section, of another embodiment of the permanent magnet system with U-shaped pole shoes, and the system is in a switched-on position.

A second embodiment of the invention is shown in FIGURE 5, wherein a stationary permanent magnet arrangement 14 is interposed between a circumferentially shiftable permanent magnet arrangement 18 and an eddy current disc 20. The magnet arrangement 18 includes an iron plate 16 which is secured to the casing 12 (shown in FIGURE 1) and permanent magnets 80, 82 which have alternately poled surfaces contiguous to the iron plate 16 and alternately poled surfaces in the plane of a nonmagnetic annular member 84. The magnets 80, 82 have been magnetized on axial extending axes so that adjacent magnets have pole surfaces of opposite polarity facing the adjacent surfaces of the pole shoes. The magnet arrangement 14 includes U-shaped pole shoes having members 70, 72 made from a magnetically permeable material and a bridge member 74 made from a ferromagnetic material. The U-shaped pole shoes are situated adjacent to the permanent magnets 80, 82 and are fastened to an annular nonmagnetic support member 76 by means of screws 78. Permanent magnets 92, 94 are interposed between adjacent pole shoes with their pole surfaces contiguous to the leg members 70, 72 and leg members 86, 88, respectively. These magnets 92, 94 have been magnetized on circumferentially extending axes so that adjacent magnets have facing pole surfaces of like polarity.

FIGURE 5 also shows clockwise flux paths A–1, A–2 and counterclockwise flux paths B–1, B–2 threading through the air gap 19. The additive nature of the flux causes an on-braking condition because of the relatively large induced eddy current in the disc 20.

Figure 6:
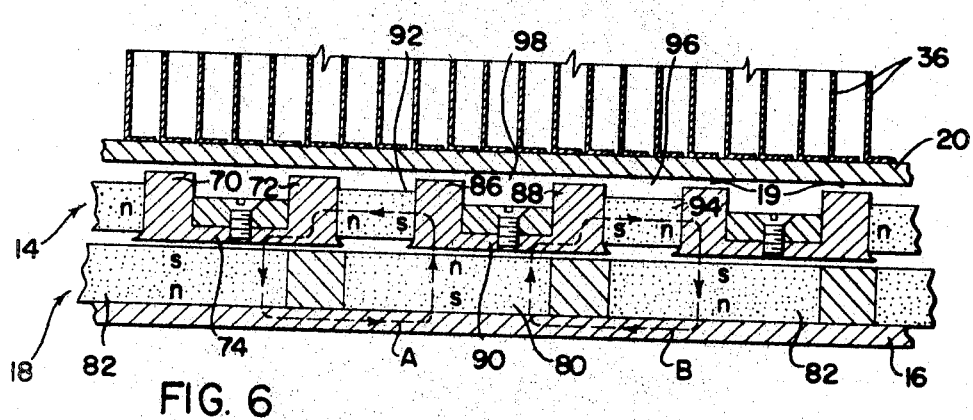
FIGURE 6 is the same embodiment as shown in FIGURE 5 in a switch-off position; and, FIGURE 7 is a partial plan view of the stationary permanent magnet arrangement along the line 7—7 in FIGURE 5.
Figure 7:
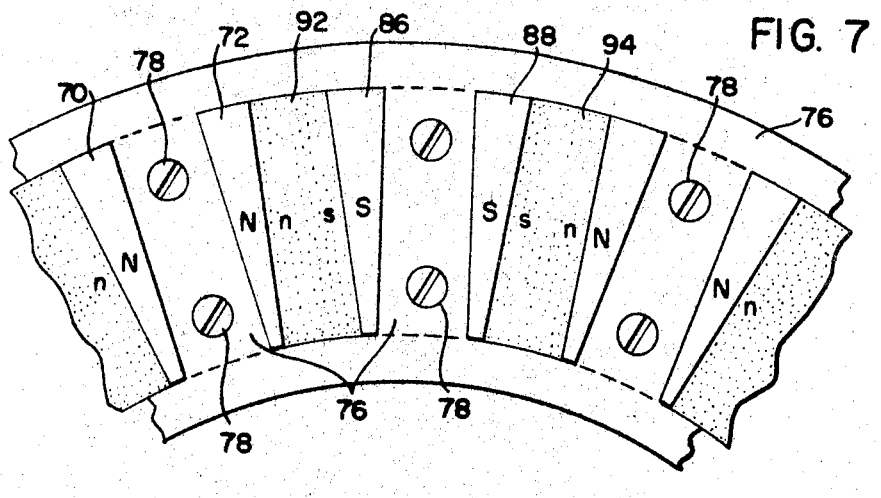

Referring now to FIGURE 7, it may be seen that the arrangement of the permanent magnets is such as to induce north poles in pole shoes 70, 72 and south poles in pole shoes 86, 88. This may be contrasted with alternately induced polarities of pole shoes 42, 44 shown in FIGURE 2. FIGURE 2, however, is the arrangement of the induced polarities in the pole shoes corresponding to the embodiment of FIGURE 3 and FIGURE 7 is the arrangement of the induced polarities in the pole shoes corresponding to the embodiment of FIGURE 5. It should be noted that in both of these embodiments there are alternate regions of induced pole shoe polarities, about the annular ring to cause a similar eddy current braking effect on disc 20. FIGURE 6 illustrates the magnet system of FIGURE 5 with the movable permanent magnet arrangement 18 shifted to an off-braking position. The permanent magnets 82, 80 have been shifted with respect to the ferromagnetic bridge members 74, 90 in order to eliminate magnetic flux in the air gap 19.

A counterclockwise magnetic flux path A and a clockwise magnetic flux path B is formed through the permanent magnets in the off-braking condition. This condition is achieved when the total of the like pole surfaces of the permanent magnets adjacent a pole shoe is equal to the oppositely poled pole surface of a permanent magnet adjacent to the pole shoe. It should be understood that the degree of braking is variable between the limiting conditions illustrated in FIGURES 5 and 6.

Reference to FIGURES 5 and 6 shows an air channel 98 between the leg members of each pole shoe through which circulating air may pass in order to cool the eddy current disc 20. The embodiment of FIGURE 5 is also provided with fan blades 36 to produce the cooling air and force it through the channels 98 in order to cool the system.

The invention has been described with reference to preferred embodiments. Obviously, modifications and alterations will occur to others upon a reading and understanding of the specification. It is my intention to include all such modifications and alterations insofar as they come within the scope of the appended claims or the equivalence thereof.

What is claimed is:

1. A magnet system for an eddy current coupling comprising:
   a first ring of circumferentially spaced permanent magnets, said first ring being stationary and said magnets being magnetized on circumferentially extending axes so that adjacent magnets have facing pole surfaces of like polarity;
   a plurality of magnetically permeable pole shoes extending axially through the spaces between adjacent said magnets so that adjacent pole shoes have alternate magnetic polarity induced thereby, each said pole shoe having a first surface adapted to form a flux air gap with an eddy current disc through which flux can thread and a second surface coaxial therewith;
   a magnetically permeable support member spaced from said first ring, and coaxial and circumferentially shiftable relative thereto;
   a second ring of circumferentially spaced permanent magnets fastened to said support member, said magnets being magnetized on axial extending axes so that adjacent magnets have pole surfaces of opposite polarity facing the second surfaces of said pole shoes to induce alternate magnetic polarity therein, the flux in the air gap adding when the pole surfaces of said second ring of magnets induce the same polarity in respective pole shoes as said first ring of magnets and the flux in the air gap subtracting when the pole surfaces of said second ring of magnets induce the opposite polarity in respective pole shoes as said first ring of magnets.

2. The magnet system of claim 1, including bearing means for circumferentially sliding said second ring relative to said first ring.

3. The magnet system of claim 2, wherein the same permanent magnet material is used for all said magnets and the polarity induced in each said pole shoe by said first ring of magnets is less than the polarity induced in each said pole shoe by said second ring of magnets when said pole surfaces of said second ring are aligned with said second surfaces of said pole shoes.

4. The magnet system of claim 3, wherein said pole shoes are U-shaped, each said pole shoe having two leg members and a bridge member, said leg members being contiguous to said magnets of said first ring and forming the first surface adapted to form a flux air gap with the eddy current disc and said bridge member forming the second surface coaxial therewith.

5. The magnet system of claim 4, wherein said leg members form air channels with the eddy current disc, and means for cooling said system is provided.

6. The magnet system of claim 5, wherein said cooling means includes fan blades fastened to the eddy current disc and means for guiding air to said air channels, said fan blades are a ferromagnetic material provided with a copper coating so that lines of flux are concentrated in the eddy current disc.

7. The magnet system of claim 3, wherein said pole shoes are T-shaped, each said pole shoe having a leg member and a transverse member, said leg member being contiguous to said magnets of said first ring and forming the first surface adapted to form a flux air gap with the eddy current disc and said transverse member forming the second surface coaxial therewith.

8. The magnet system of claim 7, wherein said leg members of adjacent said pole shoes form air channels with the eddy current disc, and means for cooling said system is provided.

9. The magnet system of claim 8, wherein said cooling means includes fan blades fastened to the eddy current disc and means for guiding air to said air channels, said fan blades are a ferromagnetic material provided with a copper coating so that lines of flux are concentrated in the eddy current disc.

References Cited

UNITED STATES PATENTS

| | | | |
|---|---|---|---|
| 2,913,605 | 11/1959 | Johnson | 310—93 |
| 3,206,655 | 9/1965 | Reijnst | 335—295 |

DAVID X. SLINEY, Primary Examiner

U.S. Cl. X.R.

310—105